United States Patent [19]

Miyake et al.

[11] Patent Number: 5,500,839
[45] Date of Patent: Mar. 19, 1996

[54] MULTIPLE COIL MAGNETIC HEAD FOR MAGNETIC OPTICAL RECORDING DEVICE

[75] Inventors: Tomoyuki Miyake, Nara; Toshiharu Inui, Yamatokoriyama; Jun Akiyama, Kashihara; Kunio Kojima, Nabari, all of Japan

[73] Assignee: Sharp Kabushiki Kaisha, Osaka, Japan

[21] Appl. No.: 362,135

[22] Filed: Dec. 22, 1994

[30] Foreign Application Priority Data

Dec. 24, 1993 [JP] Japan .................... 5-328840

[51] Int. Cl.⁶ .................................................. G11B 11/00
[52] U.S. Cl. ........................................ 369/13; 360/114
[58] Field of Search ................... 369/13, 14; 360/114, 360/46, 59, 123, 66; 365/122

[56] References Cited

U.S. PATENT DOCUMENTS

| | | | |
|---|---|---|---|
| 5,157,641 | 10/1992 | Lehureau | 369/13 |
| 5,233,577 | 8/1993 | Bakx et al. | 369/13 |
| 5,313,444 | 5/1994 | Ishii et al. | 369/13 |
| 5,331,477 | 7/1994 | Sugiyama | 360/46 |
| 5,351,155 | 9/1994 | Ishii | 360/46 |
| 5,359,466 | 10/1994 | Fuji et al. | 360/46 |

FOREIGN PATENT DOCUMENTS

| | | |
|---|---|---|
| 1-178104 | 7/1989 | Japan . |
| 5298774 | 4/1992 | Japan . |
| 4-103322 | 9/1992 | Japan . |
| 6-24041 | 3/1994 | Japan . |

Primary Examiner—Georgia Y. Epps
Assistant Examiner—Tan Dinh

[57] ABSTRACT

A magneto-optical recording and reproducing apparatus includes a magnetic head for modulating a magnetic field according to a recording signal. There are three separate coils around a single magnetic core the magnetic head. Three coil driving circuits are included, each one associated with a separate coil for switching the direction of magnetic field generated by said separate coils. A selecting circuit is used for starting or stopping the transmission of the recording signal to the coil driving circuits.

13 Claims, 11 Drawing Sheets

MULTIPLE COIL MAGNETIC HEAD FOR MAGNETIC OPTICAL RECORDING DEVICE

FIELD OF THE INVENTION

The present invention relates to a magneto-optical recording and reproducing apparatus including a magnetic head and a magnetic-field generator for use in magnetic-field-modulation recording in which recorded information is rewritten by recording new information over the previously recorded information without erasing the previously recorded information by modulating a magnetic field.

BACKGROUND OF THE INVENTION

Development of storage mediums on and from which information is recorded, reproduced and erased, particularly, magneto-optical disks characterized by large capacity and high-density recording has been carried out.

The magneto-optical disks are communicative. A conventional fixed hard disk has a closed structure. A fixed hard disk with a replaceable disk cartridge has been developed. In order to compete with such a fixed disk, a main object of development of magneto-optical disks is to realize a high-speed transfer device and high-speed access. In order to achieve the object, the development of a so-called overwrite technique is being actively carried out. The overwrite technique allows rewriting of recorded information by recording new information over the previously recorded information without erasing the previously recorded information.

A magnetic-field-modulation recording method is used for overwriting. With this method, recording and erasure of information on a magneto-optical disk are performed by reversing the direction of an external magnetic field using a magnetic head while applying laser light of a uniform intensity on the magneto-optical disk according to information to be recorded.

The magnetic-filed-modulation recording method uses a floating magnetic head or a fixed magnetic head. The floating magnetic head is mounted on a slider and pushed toward one of the surfaces of a magneto-optical disk by a suspension made of a plate spring. Therefore, when a flow of air occurs with a rotation of the magneto-optical disk, the magnetic head floats over the magneto-optical disk while keeping a uniform small gap between the magnetic head and the magneto-optical disk. Whereas, in contrast the fixed magnetic head is held in a position with a predetermined gap between the magnetic head and the magneto-optical disk so as to prevent the magnetic head and the magneto-optical disk from coming into contact with each other due to a vibration of a surface of the magneto-optical disk.

There is a magnetic field modulation recording method in which, when the rotation speed of a magneto-optical disk is not so high like a mini disk and a recordable and reproducible compact disk which is rotated at a speed of 190 to 400 rpm, the magnetic head is brought into contact with the magneto-optical disk, or the magnetic head is buried in a sliding member and the sliding member is brought into contact with the magneto-optical disk.

Figure 14:
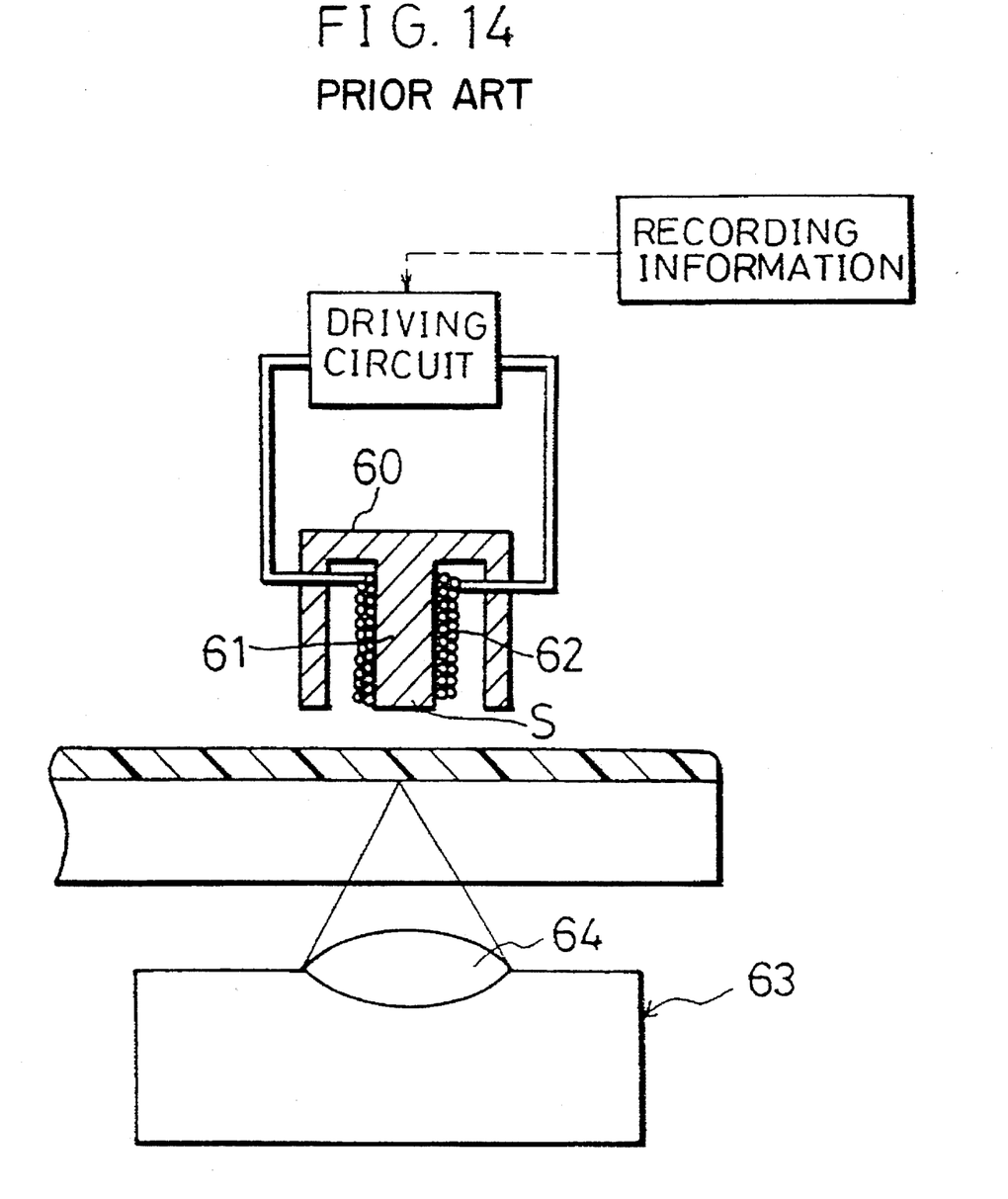
FIG. 14 is a depiction showing a magnetic head and a magnetic-field generator in a conventional prior art magneto-optical recording and reproducing apparatus.

For example, as illustrated in FIG. 14, a conventional magnetic head 60 used in such a magneto-optical recording and is reproducing apparatus is constructed by winding a coil 62 around a magnetic core 61. For example, when the coil 62 is made of wire with 60 turns, the inductance is 30 µH.

With the above-mentioned overwriting recording method on the magneto-optical disk, in order to modulate a magnetic field at a high speed, it is necessary to decrease the inductance of the magnetic head 60. Namely, it is necessary to reduce the cross section of the magnetic core 61.

Then, in order to modulate a magnetic field at a high speed without changing the magnetic field generating area, the development of a magnetic head having coils around a single magnetic core is being carried out.

However, the strength of an external magnetic field generated by the conventional magnetic head 60 is uniform and can not be varied. In the magnetic head having coils, in order to vary the external magnetic field strength using a conventional coil driving circuit, it is necessary to change the value of a power source voltage. In the conventional magneto-optical recording and reproducing apparatus, changing the value of the power source voltage is very difficult. Moreover, if the value of the power source voltage is to be changed, the size of the circuit needs to be enlarged, resulting in an increase in production costs.

In the conventional magneto-optical recording and reproducing apparatus, since the external magnetic field strength is not easily changed, it is impossible to apply magnetic fields of optimum strengths to disks having different magnetic field sensitivities.

SUMMARY OF THE INVENTION

An object of the present invention is to provide a magneto-optical recording and reproducing apparatus capable of switching the direction a magnetic field at a high speed and varying the strength of the external magnetic field.

In order to achieve the above object, a magneto-optical recording and reproducing apparatus of the present invention includes:

a magnetic head for recording information on a storage medium by modulating a magnetic field according to a recording signal, the magnetic head including a magnetic core and coils wound on the magnetic core;

a coil driving circuits for switching the direction of the magnetic field generated by the coils according to the recording signal, each of the coil driving circuit driving at least one of the coils; and a selecting circuit for selectively controlling the transmission of the recording signal to each of the coil driving circuits.

With this structure, since the magnetic head of the present invention includes coils, it is possible to apply the present invention to the structure where a single coil included in a conventional magnetic head is separated into coils.

When the inductance of a single coil and the inductance obtained by the separate coils are compared, as described in embodiments, the total inductance of the separate coils is smaller without changing the cross section of a magnetic core around which the coils are wound. Since it is known that the speed of switching the direction of a magnetic field (hereinafter referred to as the switching speed of magnetic field) is increased by decreasing the inductance of the Coil, if coils are used in such a manner that at least one coil driving circuit drives at least a coil, a high-speed magnetic field switching is achieved without changing the cross section of the magnetic core. Therefore, if a conventional magnetic field generating area is maintained, an improved switching speed of magnetic field is obtained. On the other hand, if the conventional switching speed of magnetic field is kept, an increased magnetic field generating area is obtained.

The transmission of the recording signal to the coil driving circuits is selectively switched between on and off by a selecting circuit. The coil driving circuits switch the direction of the magnetic field generated by the coils, i.e. drive the coils according to the transmitted recording signal. Since each of the coil driving circuits drives at least one coil, the number of coil driving circuits is selected from a range between two and the number of the coils. For example, when driving three coils with three coil driving circuits, the number of coils to be driven is selected from one to three by the selecting circuit. It is thus possible to change the strength of the magnetic field to be applied to the storage medium by the magnetic head among three levels.

Furthermore, if six coils are included in the magnetic head, it is possible provide six coil driving circuits. In this case, it is possible to arrange each of the coil driving circuits to correspond to each of the coils, and to change the number of coils to be driven among six numbers by the selecting circuit. It is also possible to arrange one of the coil driving circuits to correspond to two coils, and to change the number of coils to be driven among three numbers by the selecting circuit.

With this arrangement, since the strength of the magnetic field to be applied to the storage medium by the magnetic head is varied, it is possible to deal with magneto-optical disks having different magnetic field sensitivities. For instance, an optimum magnetic field strength for a magneto-optical disk is obtained in advance by performing test writing on a test recording section of the magneto-optical disk, and the number of coil driving circuits to which the recording signal is to be transmitted is set according to the obtained magnetic field strength. At this time, the value of the optimum magnetic field strength may be recorded on the magneto-optical disk.

Hence, the magneto-optical recording and reproducing apparatus of the present invention is capable of recording information while applying a magnetic field of an optimum strength to a magneto-optical disk in accordance with the magnetic field sensitivity of the magneto-optical disk Consequently, since there is no need to apply a magnetic field of excessive strength to a magneto-optical disk, the power consumption of the magneto-optical recording and reproducing apparatus is decreased. Additionally, since it is possible to apply a magnetic field of a sufficient strength to a magneto-optical disk of poor magnetic field sensitivity, information is recordable on such a magneto-optical disk.

For a fuller understanding of the nature and advantages of the invention, reference should be made to the ensuing detailed description taken in conjunction with the accompanying drawings.

DESCRIPTION OF THE PREFERRED EMBODIMENTS

[Embodiment 1]

The following description discusses one embodiment of the present invention with reference to FIGS. 1 to 10.

Figure 1:
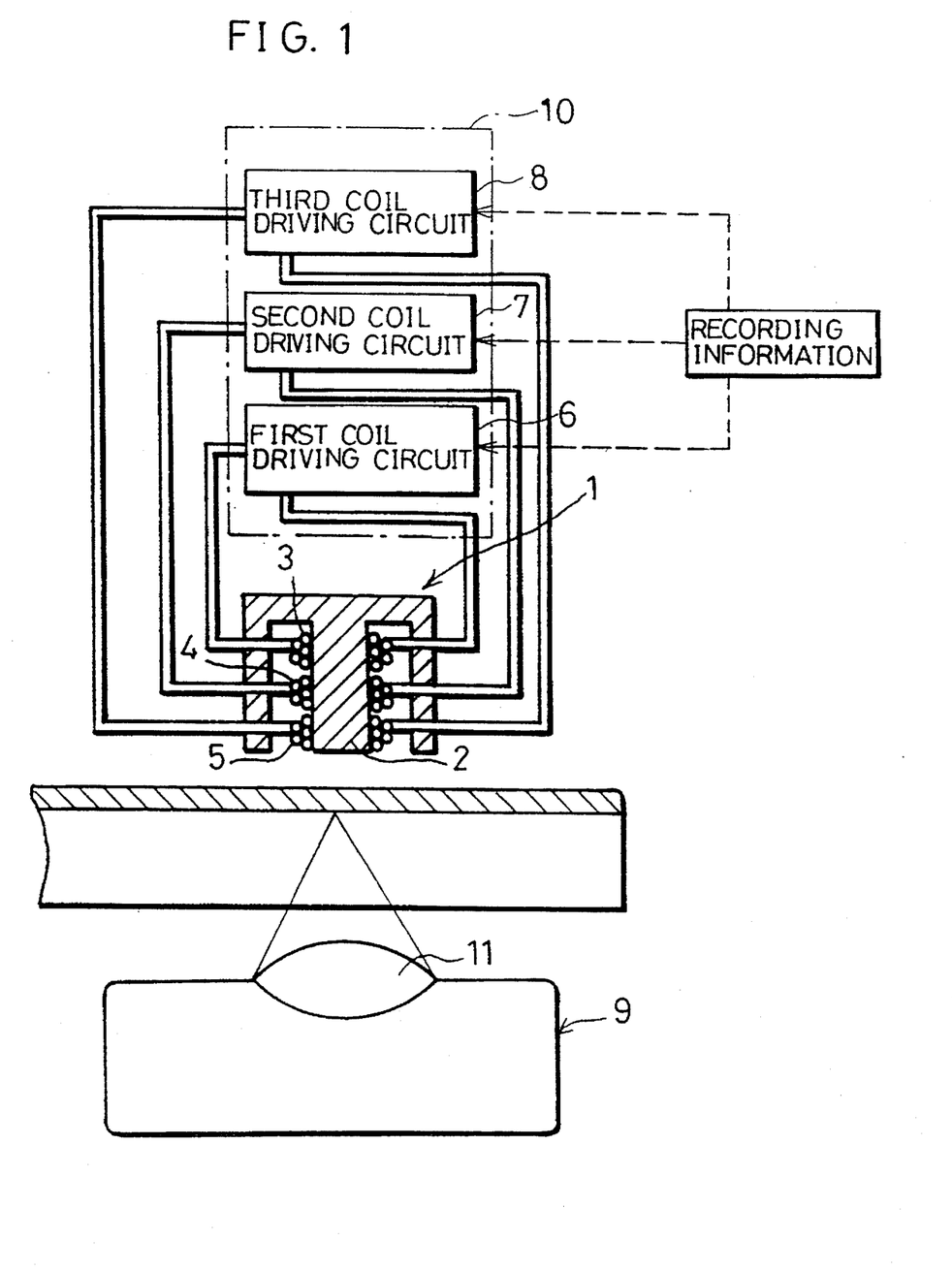
FIG. 1 is a depiction illustrating a magnetic head and a magnetic-field generator in a magneto-optical recording and reproducing apparatus of the present invention.

As illustrated in FIG. 1, a magneto-optical recording and reproducing apparatus of this embodiment includes a magnetic head 1 for magnetic-field-modulation recording, a magnetic-field generator having a coil driving circuit 10, and an optical pickup 9.

The optical pickup 9 includes an objective lens 11 for applying laser light to a magneto-optical disk. The objective lens 11 and a magnetic core 2 are positioned so that laser light is converged on a location of the magneto-optical disk corresponding to the center of the magnetic core 2.

The magnetic head 1 for use in magnetic-field-modulation recording (hereinafter just referred to as the magnetic head) is explained below.

The magnetic head 1 is capable of overwriting the magneto-optical disk. With the overwriting technique, when rewriting information recorded on the magneto-optical disk, new information is recorded over the previously recorded information without erasing the previously recorded information.

Figure 2:
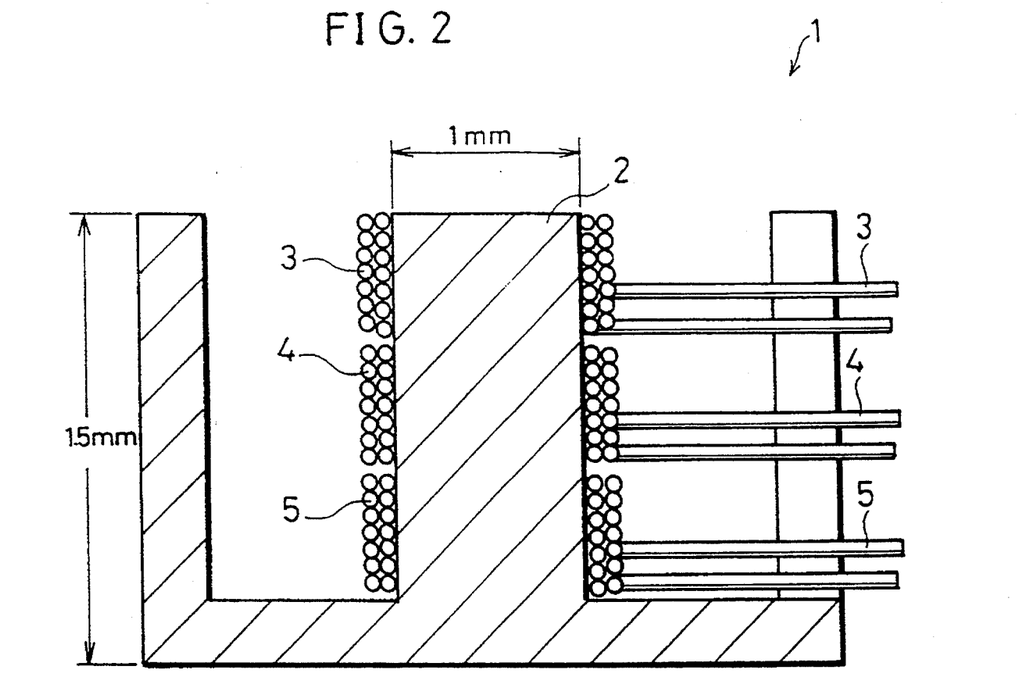
FIG. 2 is a cross section showing the structure of the magnetized in detail.

As illustrated in FIG. 2, the magnetic head 1 has an E-shaped cross section, and includes coils 3, 4 and 5 around the center section of the magnetic core 2. The magnetic core 2 is around 1 mm in width and around 1.5 mm in height. The coils 3, 4 and 5 are arranged in series in this order from the top toward the bottom. Each of the coils 3, 4 and 5 are made of a conducting wire with a diameter of 50 μm wound in a series of 20 turns to a height of around 0.5 mm. The inductance of each of the coils 3, 4 and 5 was individually measured. The resulting inductance was in a range between 4 μH and 6 μH.

In this embodiment, three coils 3, 4 and 5 are used. Since each of the coils 3, 4 and 5 are made of the conducting wire with 20 turns. This is similar to the structure including a coil of wire with 60 turns wound around the magnetic core 2.

With the structure of this magnetic head 1, the three separate coils 3, 4 and 5 are placed around a single magnetic core 2, the inductance of the coils 3, 4 and 5 becomes smaller than the inductance of a conventional coil. It is thus possible to switch the magnetic field at a high speed without changing the cross section of the magnetic core 2. The reason why the inductance becomes smaller is explained below.

In general, the inductance L of a magnetic head is given by $$L \propto (S \cdot n^2) \quad (1)$$

where n is the number of turns of a coil, and S is the cross section of a magnetic core.

The inductance L and a switching speed of magnetic field (di/dt) give to the coil driving circuit a back electromotive force V given by $$V = L \cdot (di/dt) \quad (2)$$

It is possible to consider that the threshold of the coil driving circuit is within a range where the back electromotive force V does not exceed the withstand voltage of the coil driving circuit.

When performing high-speed magnetic-field-modulation recording, as known by the equation (2), since the switching speed of-magnetic field (di/dt) is increased, the back electromotive force V becomes larger unless the inductance L is decreased, preventing the coil from being driven. In order to reduce the inductance L, as known by (1), it is necessary to decrease either the number of turns of the coil, n, or the cross section of the magnetic core, S.

As a method for reducing the inductance L by decreasing the number of turns of coil, a coil in a magnetic head is separated into m pieces of coils with equal turns. With this method, it is possible to decrease the inductance L without changing the total number of turns of coil due to the following reason.

Namely, when the coil is separated into the m pieces of coils, the inductance of each coil becomes $L/m^2$. It is therefore possible to increase the switching speed of magnetic field (di/dt) by $m^2$ times. However, since the separate coils are arranged in series along the direction of magnetic flux, if the same recording signal is simultaneously applied to all the coils, the number of lines of magnetic flux in a single coil becomes m times of the number of lines of magnetic flux per coil. More specifically, since the inductance L is the number of lines of magnetic flux per unit current, the inductance Lm of each of the coils becomes L/m. For example, when a coil is separated into three coils, the inductance $L_3$ becomes ⅓ times of the conventional inductance, thereby achieving a switching speed of magnetic field which is three times higher than the conventional speed.

Consequently, when the magnetic head 1 having coils is used, an improved switching speed of magnetic field is achieved. Specifically, if the linear speed of the magneto-optical disk is the same, recording is performed at a higher frequency, thereby enabling higher density recording.

The maximum switching speed in the magnetic head 1 is calculated by the equation (2). At this time, coil driving circuits 6, 7 and 8 in the coil driving circuit 10 are constructed to have the structure of a coil driving circuit 20 shown in FIG. 3, to be described later. Transistors $Q_1, Q_2, Q_3$ and $Q_4$, which are used for driving a coil (L) 22 of the coil driving circuit 20, have a withstand voltage of 80 V and switch the direction of a current of ±0.2 A in the coils 3, 4 and 5.

Thus, the maximum switching speed of the magnetic head 1 becomes not higher than 50 ns. This proves that it is possible to drive the coil driving circuit 10 at a switching speed not higher than 50 ns. Whereas, the maximum switching speed by the conventional magnetic head is 150 ns. Thus, with the magnetic head 1, it is possible to expect a switching speed which is three time higher than that of the conventional device. Moreover, since the magnetomotive force applied to the magnetic core 2 is the same as that applied to a single coil (L) 22, the generated magnetic field in the magnetic head 1 is the same.

An experiment was carried out using a magnetic head including coils for confirmation. The results are as follows.

The magnetic head used in this experiment was constructed by winding a set of two copper wires with 25 turns around a 1.1 mm×1.2 mm E-shaped magnetic core having magnetic poles. Namely, a coil of 50 turns is wound around the magnetic core. The inductance of each of the coils was 4.5 μH (1 MHz). In order to make a comparison with a conventional example, a magnetic head was prepared using a coil of a single copper wire with 50 turns. The copper wire used for this head is the same as the above-mentioned copper wire. The inductance of this coil was 19 μH (1 MHz).

In this experiment, a circuit constructed by connecting two coil driving circuits 20 shown in FIG. 3, to be described later, in parallel was used for driving the magnetic head having the two coils. On the other hand, the coil driving circuit 20 was used for the conventional magnetic head. The same transistors and diodes were used for both of the coil driving circuits.

The shortest switching time of the magnetic field, the highest recording frequency and the power consumption were measured with respect to both of the magnetic heads. The amplitude of current was ±0.2 A. The shortest switching time of the magnetic field and the highest recording frequency were measured without capacitors. A capacitor was selected to achieve the same switching speed of magnetic field (150 ns, the amplitude of current was 10 % to 90%), and the power consumption was measured at a uniform frequency. The frequency dependence of the power consumption is shown in FIG. 8.

With the experiments under the above-mentioned conditions, when the magnetic head having the two coils was used, the shortest switching time of the magnetic field was 50 ns (the amplitude of current was 10% to 90%), the highest recording frequency was 1 MHz, and the power consumption was 0.58 W (1 MHz).

On the other hand, when the conventional magnetic head was used, the shortest switching time of the magnetic field was 75 ns (the amplitude of current was 10% to 90 %), the highest recording frequency was 0.8 MHz, and the power consumption was 0.75 W (1 MHz). Although the value of the shortest switching time of the magnetic field of the conventional magnetic head is slightly deviated from the theoretical value, the results of the experiment show that the structure of the magnetic head having the two coils gives improved results.

Figure 8:
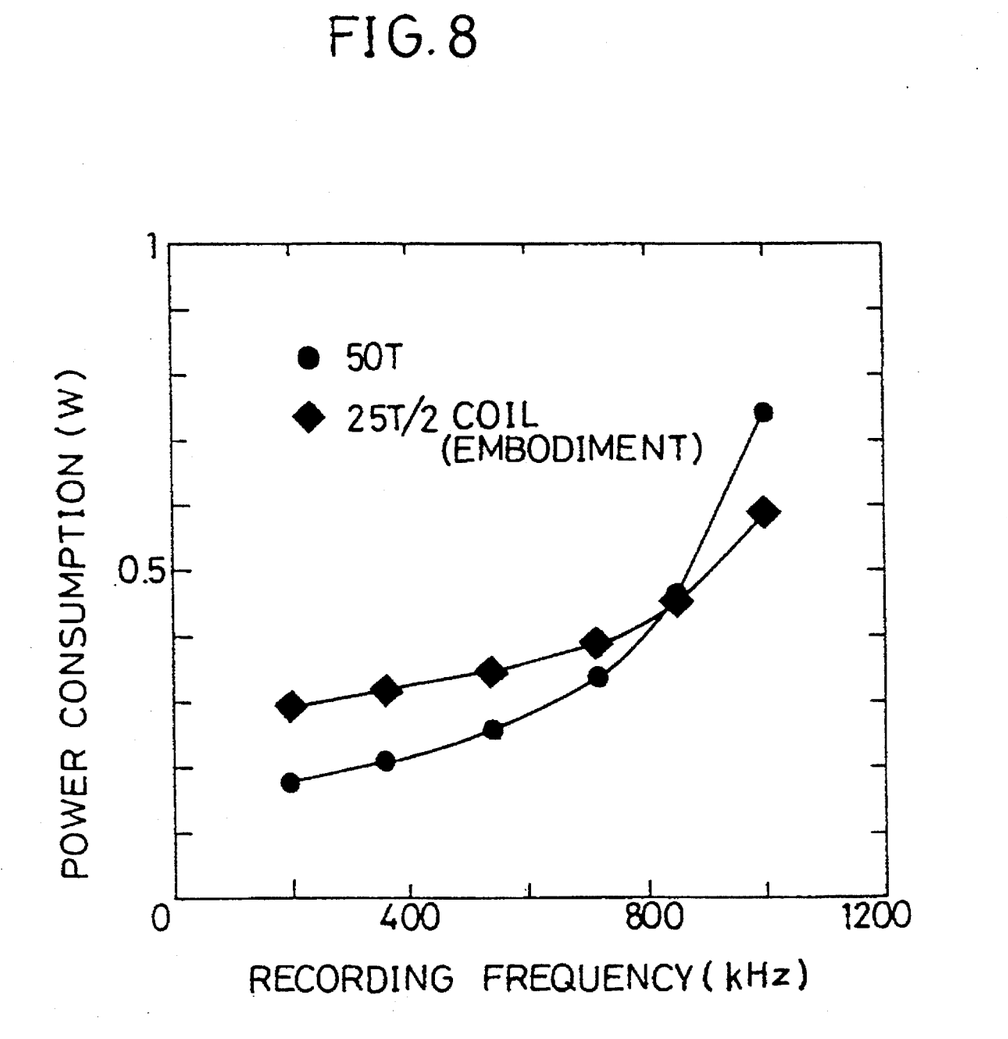
FIG. 8 is a graph showing a relationship between the power consumption a recording frequency.

As shown in FIG. 8, the power consumption of the magnetic head with two coils becomes smaller than that of the conventional magnetic head, particularly, when the recording frequency is high.

When recording information using the magnetic head 1 having the separate coils, it is necessary to apply magnetic fields simultaneously to the magnetic core 2 through the coils 3, 4 and 5. The reason for this is that since it is desirable to switch the magnetic filed as fast as possible and to switch the external magnetic field at the same speed in the respective coils. There are two methods for achieving a uniform switching speed of magnetic field.

In one method, the number of turns per coil is changed so that the respective coils have the same inductance. This is clear because the inductance depends on the number of turns of coil as described above. In another method, the coil driving circuit is adjusted. For example, as illustrated in FIG. 3, the magnetic field is switched using the resonance phenomena of an LC parallel circuit 21 (see Japanese Publication of Unexamined Patent Application No. 130302/1989 of Philips Corporation). In the LC parallel circuit 21, the resonance frequency is varied by adjusting the capacitance of a capacitor C with respect to the inductance of the coils. Since the resonance frequency corresponds to the switching speed of magnetic field, the switching speed of magnetic fields in the respective coils are made uniform by adjusting the capacitance of the capacitor in the circuit.

Figure 3:
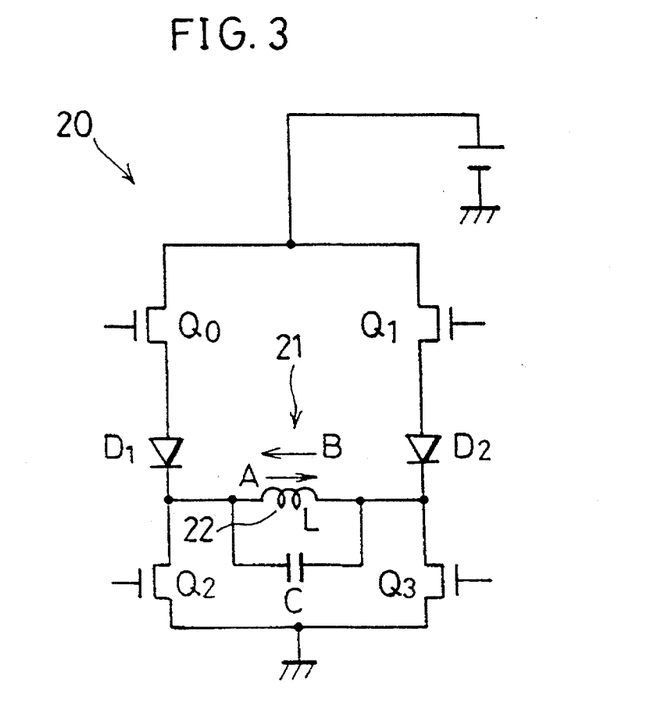
FIG. 3 is a circuit diagram of a coil driving circuit in the magnetic-field generator.

The coil driving circuit 20 shown in FIG. 3 is constructed by the LC parallel circuit 21 including the coil (L) 22 and a capacitor C, transistors $Q_0$, $Q_1$, $Q_2$ and $Q_3$, diodes $D_1$ and $D_2$. The transistors $Q_0$ to $Q_3$ are FETs (field-effect transistors).

The anode of the diode $D_1$ is connected to the source of the FET $Q_0$, while the cathode thereof is connected to the drain of the FET $Q_2$. The FET $Q_1$, the diode $D_2$ and the FET $Q_3$ are connected to each other in the same manner as the FET $Q_0$, the diode $D_1$ and the FET $Q_2$. A uniform power source voltage is applied to the drains of the FET $Q_0$ and FET $Q_1$. The sources of the FET $Q_2$ and FET $Q_3$ are earthen. The cathodes of the diodes $D_1$ and $D_2$ are connected to each other with the coil (L) 22. The capacitor C is connected to the coil (L) 22 in parallel.

In the coil driving circuit 20, the magnetic field is switched as follows. When the FETs $Q_1$ and $Q_2$ are turned off while turning on the FETs $Q_0$ and $Q_3$, a current flows in the direction of arrow A in the coil (L) 22. Whereas, when the FETs $Q_0$ and $Q_3$ are turned off while turning on the FETs $Q_1$ and $Q_2$, a current flows in the direction of arrow B in the coil (L) 22.

The coil driving circuit 10 of this embodiment employs such a structure of the coil driving circuit 20.

Figure 6:
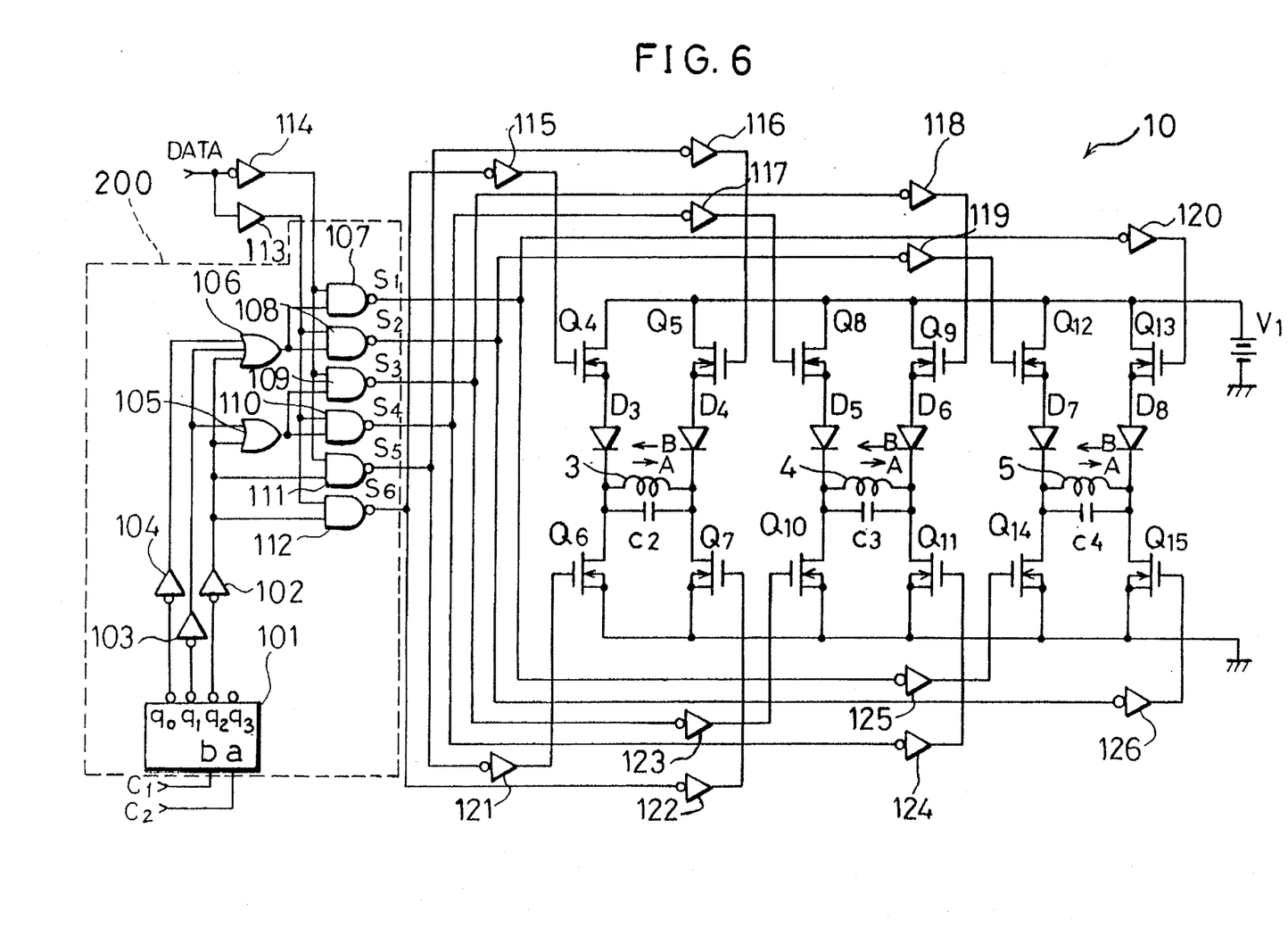
FIG. 6 is a circuit diagram showing the coil driving circuit and a selecting circuit in the magnetic-field generator.
Figure 7:
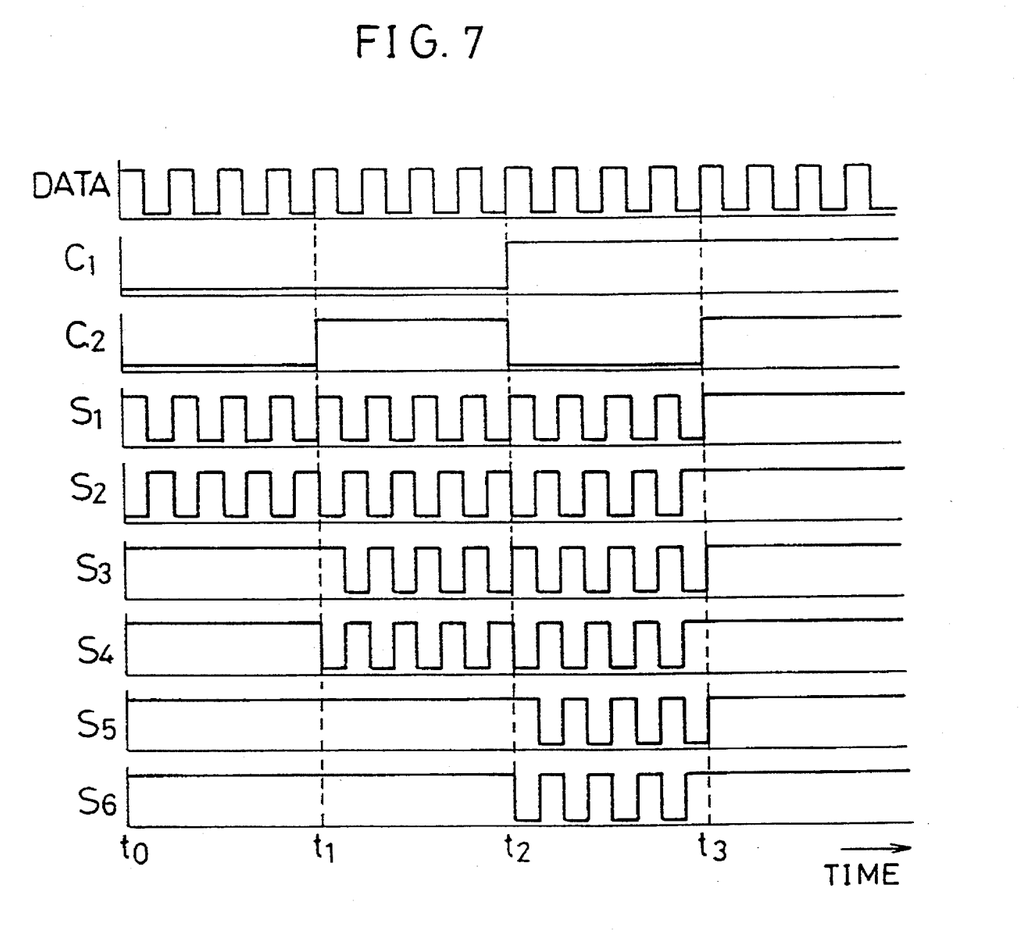
FIG. 7 is a timing chart of operations of the circuits shown in FIG. 6.

As illustrated in FIG. 1, the coil driving circuit 10 is constructed by the first coil driving circuit 6, the second coil driving circuit 7, the third coil driving circuit 8 for driving the coils 3, 4 and 5, respectively. Information to be recorded is input to the first to third coil driving circuits 6, 7 and 8 through a selecting circuit 200 controlled by recording magnetic field control signals $C_1$ and $C_2$, to be described later. Referring now to FIGS. 6 and 7, a magnetic-field generator including the coil driving circuit 10 is explained below.

In order to vary the strength of the generated magnetic field in the magnetic head 1, it is necessary to change the power source voltage. It is extremely difficult to change the value of the power source voltage in the apparatus. In order to change the value of the power source voltage, the size of the circuit needs to be made larger, resulting in an increase in the production cost.

Then, in the magnetic-field generator of this embodiment, as illustrated in FIG. 6, the strength of the generated magnetic field is varied under the control of ICs. The magnetic-field generator includes the coil driving circuit 10 and the selecting circuit 200.

The coil driving circuit 10 switches the direction of the magnetic field generated by the coils 3, 4 and 5 by a DATA signal transmitted to the coils 3, 4 and 5. The selecting circuit 200 changes the number of the coils to be driven by selectively starting or stopping the transmission of the DATA signal to the coils 3, 4 and 5.

The coil driving circuit 10 is constructed by the first to third coil driving circuits 6, 7 and 8, and a power source voltage $V_1$. The first to third coil driving circuits 6, 7 and 8 have the same structure as the coil driving circuit 20 shown in FIG. 3 and connected to each other in parallel. The first coil driving circuit 6 includes inverters 115, 116, 121 and 122, the FETs $Q_4$ to $Q_7$, the diodes $D_3$ and $D_4$, and a capacitor $c_2$. The second coil driving circuit 7 includes inverters 117, 118, 123 and 124, the FETs $Q_8$ to $Q_{11}$, the diodes $D_5$ and $D_6$, and a capacitor $c_3$. The third coil driving circuit 8 includes inverters 119, 120, 125 and 126, the FETs $Q_{12}$ to $Q_{15}$, the diodes $D_7$ and $D_8$, and a capacitor $c_4$. The capacitors $c_2$ to $c_4$ are arranged so as to achieve a uniform switching speed of magnetic field in the coils 3, 4 and 5.

The selecting circuit 200 is constructed by first to third gate switching signal generating circuits and first to third gate circuits.

The first gate switching signal generating circuit includes a two-bit binary decoder 101, inverters 102, 103 and 104, an OR gate 106 with three inputs. The second gate switching signal generating circuit includes the binary decoder 101, the inverters 102 and 103, an OR gate 105 with two inputs. The third gate switching signal generating circuit includes the binary decoder 101, and the inverter 102. The binary decoder 101 has input terminals a and b, and output terminals $q_0$ to $q_3$.

The first gate circuit includes NAND gates 107 and 108. The second gate circuit includes NAND gates 109 and 110. The third gate circuit includes NAND gates 111 and 112.

The first gate switching signal generating circuit and the first gate circuit are connected as follows. The output terminals $q_0$ to $q_2$ of the binary decoder 101 are connected to the three input terminals of the OR gate 106 through the inverters 102, 103 and 104, respectively. The output terminal of the OR gate 106 is connected to one of the input terminals of each of the NAND gates 107 and 108.

The first gate circuit and the third coil driving circuit 8 are connected as follows. The output terminal of the NAND gate 107 is connected to the gate of the FET $Q_{13}$ through the inverter 120, and is also connected to the gate of the FET $Q_{14}$ through the inverter 125. The output terminal of the NAND gate 108 is connected to the gate of the FET $Q_{12}$ through the inverter 119, and is also connected to the gate of the FET $Q_{15}$ through the inverter 126.

The second gate switching signal generating circuit and the second gate circuit are connected as follows. The output terminals $q_1$ and $q_2$ of the binary decoder 101 are connected to the two input terminals of the OR gate 105 through the inverters 102 and 103, respectively. The output terminal of the OR gate 105 is connected to one of the input terminals of each of the NAND gates 109 and 110.

The NAND gates 109 and 110 in the second gate circuit and the FETs $Q_8$ to $Q_{11}$ in the second coil driving circuit 7 are connected to each other in the same manner as the NAND gates 107 and 108 and the FETs $Q_{12}$ to $Q_{15}$ are connected to each other.

The third gate switching signal generating circuit and the third gate circuit are connected as follows. The output terminal $q_2$ of the binary decoder 101 is connected to one of the input terminals of each of the NAND gates 111 and 112 through the inverter 102.

The NAND gates 111 and 112 in the third gate circuit and the FETs $Q_4$ to $Q_7$ in the first coil driving circuit 6 are connected to each other in the same manner as the NAND gates 107 and 108 and the FETs $Q_{12}$ to $Q_{15}$ are connected to each other.

The FETs $Q_4$ to $Q_{15}$, diodes $D_3$ to $D_8$, capacitors $c_2$ to $c_4$ in the first to third coil driving circuits 6, 7 and 8 are connected to the coils 3, 4 and 5, respectively, in the same manner as the FET $Q_0$ to $Q_3$, diodes $D_1$ and $D_2$, capacitor C, and coil (L) 22 are connected to each other. A uniform power source voltage $V_1$ is applied to the drains of the FETs $Q_4$, $Q_5$, $Q_8$, $Q_9$, $Q_{12}$ and $Q_{13}$, while the sources of the FETs $Q_6$, $Q_7$, $Q_{10}$, $Q_{11}$, $Q_{14}$ and $Q_{15}$ are earthen.

The DATA signal is input to the other input terminals of the NAND gates 107, 109 and 111 in the first to third gate circuits through the inverter 114 as well as to the other input terminals of the NAND gates 108, 110 and 112 through a buffer 113. At this time, the DATA signal is separated into two signals of opposite phases by the inverter 114 and the buffer 113.

The recording magnetic field control signals $C_1$ and $C_2$ for selectively starting or stopping the transmission of the DATA signal to the coils 3, 4 and 5 are input to the input terminals a and b of the binary decoder 101 in the selecting circuit 200. At this time, the output levels of the signals $C_1$ and $C_2$ are fixed at high or low by a control signal generating circuit for controlling a recording magnetic field, connected to the input terminals a and b of the binary decoder 101. Namely, there are four combinations of the levels of the signals $C_1$ and $C_2$.

Referring to FIG. 6 and the timing chart of FIG. 7, the operations of the circuits in the magnetic-field generator are discussed below.

When the signals $C_1$ and $C_2$ are low level at time $t_0$, only an output from the output terminal $q_0$ of the two-bit binary decoder 101 becomes low level. Then, a high level signal, a low level signal and a low level signal are input to the three input terminals of the OR gate 106, respectively. Therefore, the OR gate 106 outputs a high level signal. The output signal is input to the NAND gates 107 and 108. The signals of opposite phases which have been obtained from the DATA signal are also input to the NAND gates 107 and 108. As a result, output signals $S_1$ and $S_2$ of the NAND gates 107 and 108 are repeatedly switched to low level and high level according to the DATA signal. However, the signals $S_1$ and $S_2$ have opposite phases.

Meanwhile, since the outputs from the output terminals $q_1$ and $q_2$ of the binary decoder 101 are high level, low level signals are respectively input to the two input terminals of the OR gate 105. Thus, an output from the OR gate 105 becomes low level. The output signal is then input to the NAND gates 109 and 110, while the DATA signals of opposite phases are input to the NAND gates 109 and 110. Hence, both of output signals $S_3$ and $S_4$ of the NAND gate 109 and 110 become high level. Similarly, signals $S_5$ and $S_6$ become high level.

As a result, the signals $S_1$ and $S_2$ are repeatedly switched to low level and high level, and sent to the inverters 120, 125, 119 and 126 so as to control the FETs $Q_{12}$ to $Q_{15}$ in the same manner as in the circuit shown in FIG. 3. Thus, a current whose direction is switched between A and B according to the DATA signal is caused flow in the coil 5. At this time, since the signals $S_3$ to $S_6$ are fixed at high levels, the current does not flow in the coils 3 and 4.

If only the signal $C_2$ is high level at time $t_1$, only the output from the output terminal $q_1$ of the two-bit binary decoder 101 becomes low level. Thus, output signals $S_1$, $S_2$, $S_3$ and $S_4$ of the NAND gates 107 to 110 are repeatedly switched to low level and high level according to the DATA signal. In this case, the signal $S_1$ and $S_3$ and the signals $S_2$ and $S_4$ have opposite phases. The signals $S_1$ to $S_4$ control the FETs $Q_8$ to $Q_{15}$ through the inverters 117 to 120 and 123 to 126 so that a current whose direction is switched between A and B flows in the coils 4 and 5. At this time, since the signals $S_5$ and $S_6$ are fixed at high level, the current does not flow in the coil 3.

At time $t_2$, the signal $C_1$ becomes high level, the signal $C_2$ becomes low level, and only the output from the output terminal $q_2$ of the two-bit binary decoder 101 becomes low level. Thus, output signals $S_1$ to $S_6$ of the NAND gates 107 to 112 are repeatedly switched to low level and high level according to the DATA signal. At this time, the phases of the signals $S_1$, $S_3$ and $S_5$ and the phases of the signals $S_2$, $S_4$ and $S_6$ are opposite to each other. The signals $S_1$ to $S_6$ control the FETs $Q_4$ to $Q_{15}$ through the inverters 115 to 126 so that a current whose direction is switched between A and B flows in the coils 3, 4 and 5.

At time $t_3$, if both the signals $C_1$ and $C_2$ become high level, all the outputs from the output terminals $q_0$ to $q_2$ of the two-bit binary decoder 101 become high level. Consequently, all the output signals $S_1$ to $S_6$ of the NAND gates 107 to 112 are always set at high level. Consequently, the current does not flow in the coils 3, 4 and 5.

In short, it is possible to vary the strength of the external magnetic field among four levels by controlling the current flowing in the coils 3, 4 and 5 by the signals $C_1$ and $C_2$ in the magnetic-field generator. However, since recording of information on the magneto-optical disk is infeasible when the strength of the magnetic field is zero, the magnetic field of three levels is actually used.

The above-mentioned content is summarized in Table 1.

[TABLE 1]

| Signal $C_1$ | Signal $C_2$ | Coil 3 | Coil 4 | Coil 5 | Magnetic field strength |
|---|---|---|---|---|---|
| L | L | OFF | OFF | ON | ⅓ times |
| L | H | OFF | ON | ON | ⅔ times |
| H | L | ON | ON | ON | maximum |
| H | H | OFF | OFF | OFF | 0 |

H: output level is high level
L: output level is low level

With the above-mentioned structure, the laser light emitted by the optical pickup 9 is converged by the objective lens 11 onto the magneto-optical disk. Only the temperature of an area of the magneto-optical disk exposed to the laser light is raised. Recording information is input to the selecting circuit 200 of the magnetic-field generator. At this time, the recording magnetic field control signals $C_1$ and $C_2$ are also input to the selecting circuit 200. As a result, in the magnetic head 1, a current whose direction is reversed according to the recording information flows in the coils 3, 4 and 5 so as to generate an external magnetic field whose direction is switched according to the information. It is thus possible to align the direction of magnetization in the area of the magneto-optical disk having an increased temperature with the direction of the external magnetic field.

In this case, since the strength of the external magnetic field is varied by the operation of the circuit, it is possible to deal with magneto-optical disks of different magnetic field sensitivities. For instance, an optimum magnetic field strength for a magneto-optical disk is calculated in advance by performing test writing on a test recording area on the magneto-optical disk. A fixed combination of the levels of the signals $C_1$ and $C_2$ is set according to the value of the optimum magnetic field strength. At this time, the value of the optimum magnetic field strength may be recorded on the magneto-optical disk.

Hence, the magneto-optical recording and reproducing apparatus of this embodiment is capable of recording information while applying magnetic fields of optimum strengths to magneto-optical disks having different magnetic field sensitivities.

Consequently, there is no need to apply an excessive magnetic field to the magneto-optical disk, thereby achieving a reduction in the power consumption of the magneto-optical recording and reproducing apparatus. Moreover, since this magneto-optical recording and reproducing apparatus is capable of applying a magnetic field of a sufficient strength to a magneto-optical disk having a poor magnetic field sensitivity, information is recordable on such a magneto-optical disk.

Figure 9A:
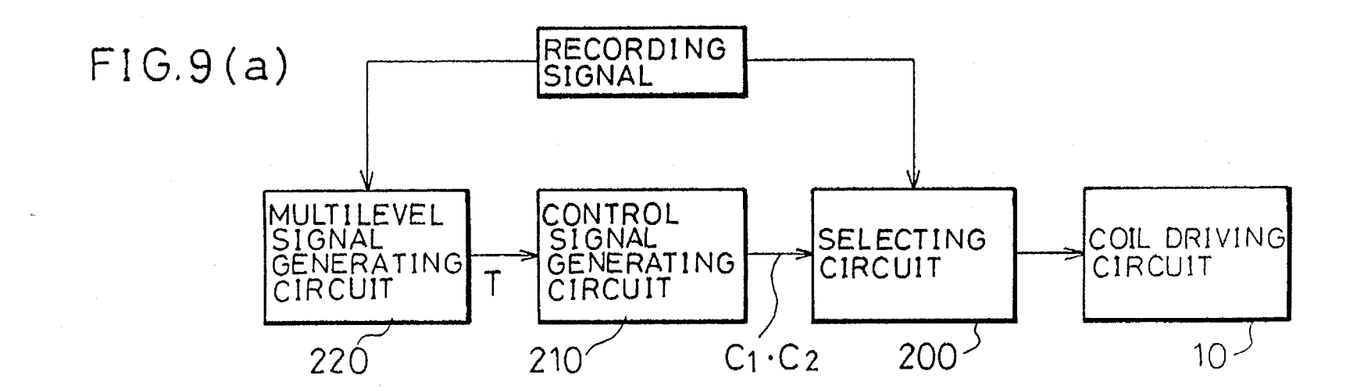
FIG. 9(a) is a block diagram schematically showing another structure of the magneto-optical recording and reproducing apparatus of the present invention.
Figure 10:
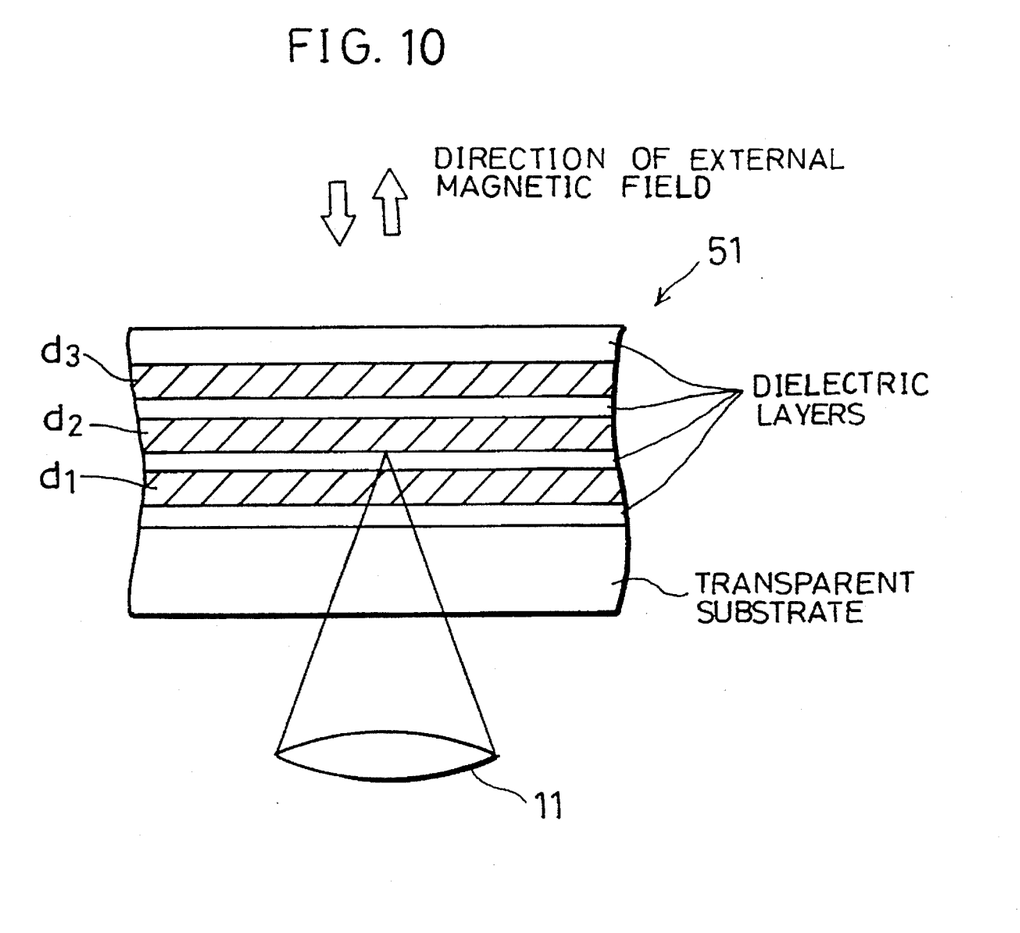
FIG. 10 is a view explaining a storage medium having a multilayer structure.

Moreover, high-density recording is achieved by using a multilevel signal generating circuit 220 shown in FIG. 9(a) and a storage medium 51 having a multilayer structure shown in FIG. 10.

As illustrated in FIG. 9(a), the multilevel signal generating circuit 220 is connected to an input terminal of a control signal generating circuit 210 for controlling a recording magnetic field. A recording signal is input to the multilevel signal generating circuit 220.

Figure 9B:
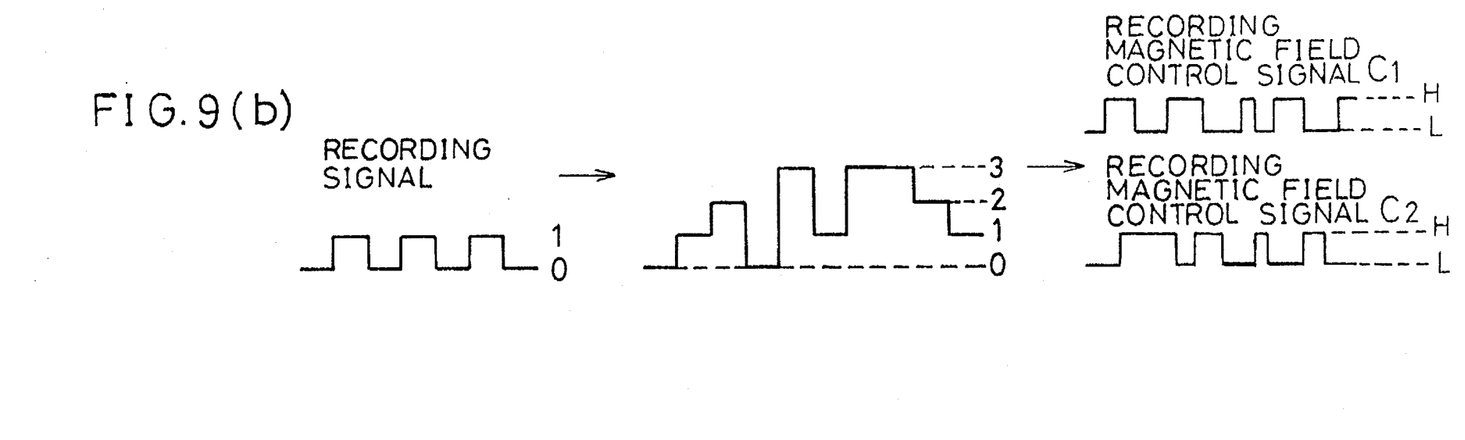
FIG. 9(b) is a view,explaining signals in FIG. 9(a).

With this structure, as shown in FIG. 9(b), the recording signal in the form of a binary (digital) signal input to the multilevel signal generating circuit 220 is converted into a multilevel signal T whose level is changed among (four levels if zero is included) according to the recording signal, for example. When the multilevel signal T is input to the control signal generating circuit 210, the binary control signals $C_1$ and $C_2$, which have high level and low level and different waveforms, are generated.

As described above, the recording signal is input to the selecting circuit 200, and the transmission thereof is controlled by the signals $C_1$ and $C_2$.

In this case, there are three combinations of the output levels of the signals $C_1$ and $C_2$ if a magnetic field strength of zero level is excluded as shown in Table 1. It is therefore possible to obtain a magnetic field of three levels (the maximum magnetic field strength is Hm) in the magnetic head 1.

The magnetic fields of two directions exist in the magnetic head 1: one direction corresponds to the current flowing in the A direction through the coils 3, 4 and 5 (indicated with the minus symbol); the other direction corresponds to the current flowing in the B direction (indicated with the plus symbol). The direction of the magnetic field is changed by switching the FETs $Q_4$ to $Q_{15}$ between on and off.

Namely, it is possible to obtain magnetic fields of six levels by six combinations of the two directions and the three strengths of magnetic fields. These combinations are shown in Table 2. The signals $C_1$ and $C_2$ keep the states shown in Table 2 during a period of time corresponding to the length of a bit recorded.

[TABLE 2]

| Multi-level Signal Value | $C_1$ | $C_2$ | Coil 3 | Coil 4 | Coil 5 | Direction and Strength of Magnetic Field |
|---|---|---|---|---|---|---|
| 0 | H | L | A | A | A | − Hm |
| 1 | L | H | OFF | A | A | −⅔ Hm |
| 2 | L | L | OFF | OFF | A | −⅓ Hm |
| 3 | L | L | OFF | OFF | B | +⅓ Hm |
| 4 | L | H | OFF | B | B | +⅔ Hm |
| 5 | H | L | B | B | B | + Hm |

H: output level is high level
L: output level is low level

Meanwhile, a storage medium having a multilayer structure is used. For example, as illustrated in FIG. 10, the storage medium 51 having three recording films $d_1$, $d_2$ and $d_3$ with different recording magnetic fields is prepared. Dielectric layers $e_1$, $e_2$ and $e_3$ are formed between the adjacent films, respectively.

The use of the storage medium 51 and the multilevel values of six levels permit quaternary recording. Namely, quaternary recording is performed by a combination of the magnetization directions of the films. In this case, however, since overwriting is infeasible, the storage medium 51 is initialized in one direction like in the normal recording operation. More specifically, if the magnetizing directions of the recording films $d_1$, $d_2$ and $d_3$ which correspond to the directions of magnetic fields of Table 2 are indicated with the plus and minus symbols, the initialized recording films $d_1$, $d_2$ and $d_3$ are magnetized in the negative direction. The magnetic fields shown in Table 2 are applied in this state.

When the multilevel value is between zero and two, since the directions of all the magnetic fields are negative, the magnetizing direction of the recording films $d_1$, $d_2$ and $d_3$ are unchanged. When the multilevel value is "3", since the magnetic field is +⅓ Hm, only the magnetizing direction of the recording film $d_1$ is changed to positive. Similarly, when the multilevel value is "4", the magnetizing directions of the recording films $d_1$ and $d_2$ are changed to positive. And, when the multilevel value is "5", the magnetizing directions of the recording films $d_1$, $d_2$ and $d_3$ are changed to positive. This is summarized in Table 3.

[TABLE 3]

| Multi-level Value | Direction and Strength of Magnetic Field | Magnetic Direction of Recording Film $d_1$ | $d_2$ | $d_3$ | Recording State |
|---|---|---|---|---|---|
| Initialized State | — | − | − | − | Nil |
| 0 | − Hm | − | − | − | 0 |
| 1 | −2/3 Hm | − | − | − | 0 |
| 2 | −1/3 Hm | − | − | − | 0 |
| 3 | +1/3 Hm | + | − | − | 1 |
| 4 | +2/3 Hm | + | + | − | 2 |
| 5 | + Hm | + | + | + | 3 |

This structure permit quaternary recording on the storage medium 51. In a prior art, binary recording signals are recorded on a storage medium. However, in this embodiment, since quaternary recording signals are recorded, the recording area for the same volume of information is decreased, achieving improved high-density recording.

Moreover, by increasing the number of recording films in the storage medium and the number of control signals for controlling recording magnetic fields, recording with signals of more than four levels becomes available. Namely, the three recording films $d_1$, $d_2$ and $d_3$ of the storage medium 51 achieve quaternary recording. Similarly, the use of N number of recording films allows recording with signals having (N+1) values. Furthermore, a storage medium having a structure which permits overwriting is also provided.

Figure 4:
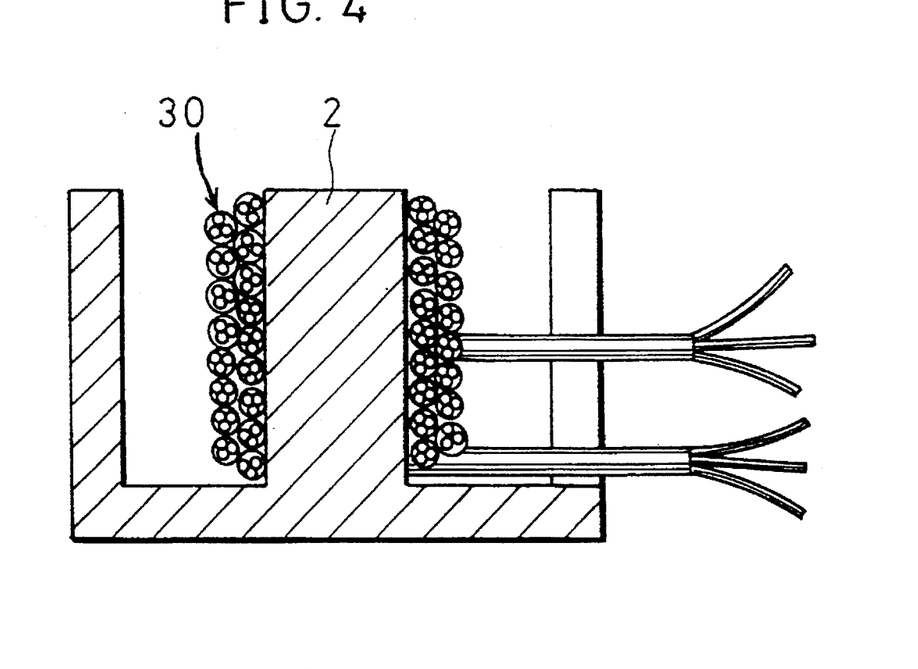
FIG. 4 is a cross section of a magnetic head having a coil of three conducting wires wound around a magnetic core as another example of the magnetic head of FIG. 2.

In this embodiment, the coils 3, 4 and 5 with the same number of turns are formed into the same shape by evenly dividing the number of turns of the conventional coil into three. However, it is not necessarily to form the coils 3, 4 and 5 in this manner. For instance, as illustrated in FIG. 4, it is possible to form coils 30 by winding a set of three conducting wires with a wire diameter of 50 μm around the magnetic core 2. In this case, compared with the structure where the coils 3, 4 and 5 are aligned in the direction of height of the magnetic core 2 shown in FIG. 1, the variations in the inductances of the coils 30 are reduced and the variations in the switching speed of magnetic fields in the coils 30 are also minimized.

Figure 5:
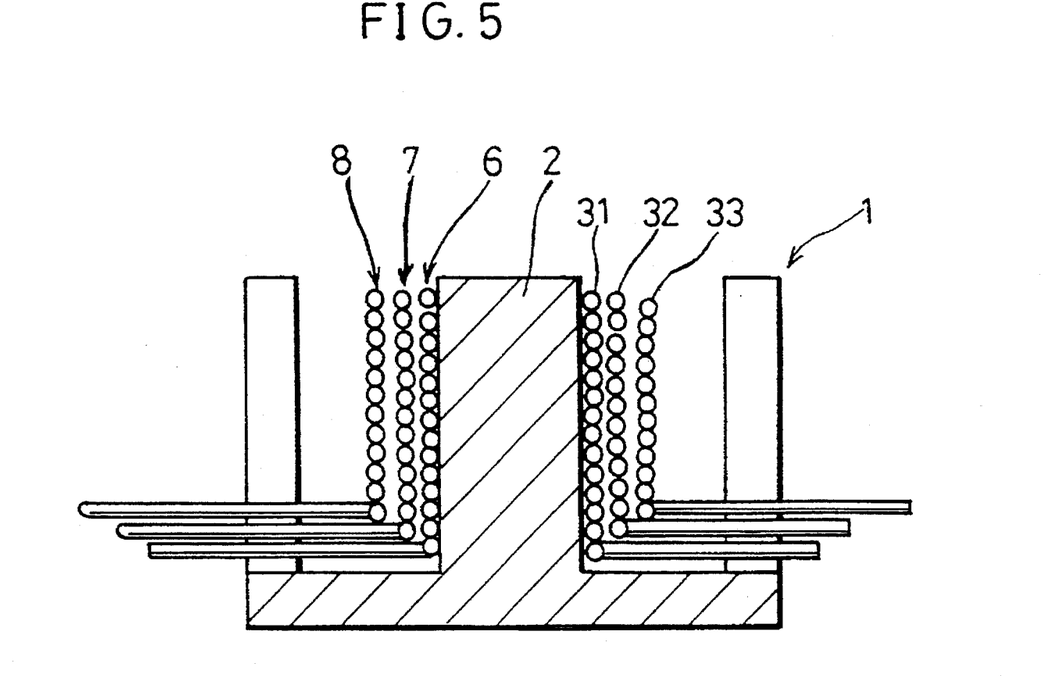
FIG. 5 is a cross section of a magnetic head having three coils of different diameters wound one upon another around a magnetic core as still another example of the magnetic head of FIG. 2.

Moreover, as illustrated in FIG. 5, it is also possible to construct the magnetic head 1 by winding coils 31, 32 and 33 of different coil diameters one upon another around the magnetic core 2. In this case, the coils 31, 32 and 33 have different inductances and impedance. However, since the magnetic field is switched at the same speed in the respective coils 31, 32 and 33 by optimizing the structure of the coil driving circuit, no trouble occurs during recording of information. This structure enables the number of coils to be easily changed by preparing coils of different radii.

The structure of each of the coil driving circuits of the magnetic head 1 of this embodiment is not restricted to the structure shown in FIG. 3. Namely, the coil driving circuit may have any suitable structures.

Furthermore, it is not necessarily to set the number of the coils and the number of the coil driving circuits equal to each other. For instance, coils may be connected to a single coil driving circuit, and a current may be arranged to flow in the coils. For example, it is possible to drive a-magnetic head having six coils with three coil driving circuits. In this case, if two coils are connected in parallel or in series and if they are driven together as a pair of coils, three coil driving circuits are required. In this case, the three pairs of the coils have the same inductance.

[Embodiment 2]

The following description discusses another embodiment of the present invention with reference to FIGS. 3, 11 to 13. The members having the same function as in the above-mentioned embodiment will be designated by the same code and their description will be omitted.

Figure 11:
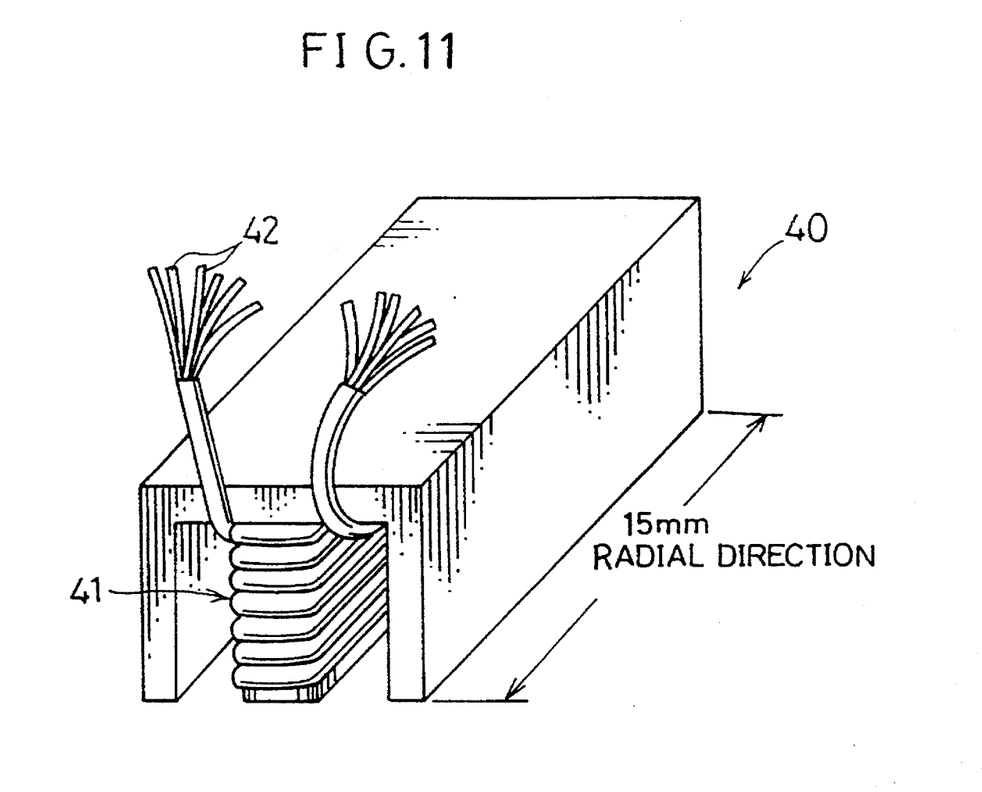
FIG. 11 is a perspective view showing the structure of a magnetic head in a magneto-optical recording and reproducing apparatus of the present invention.

As illustrated in FIG. 11, in order to use a magnetic head 40 of this embodiment for a magneto-optical disk, for example, a 2.5-inch mini disk (MD), one dimension of the magnetic head 40 in a radial direction of the magneto-optical disk is arranged 15 mm. The magneto-optical disk, for example, the 2.5-inch MD has a information recording area between a radius of 16 mm and a radius of 30 mm. Thus, the magnetic field generated by the magnetic head 40 is effective on a plurality of tracks of the magneto-optical disk.

Figure 12A:
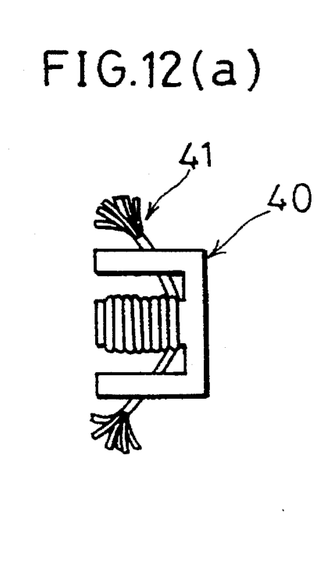
FIG. 12(a) is a back view showing the structure of the magnetic head of FIG. 11.
Figure 12B:
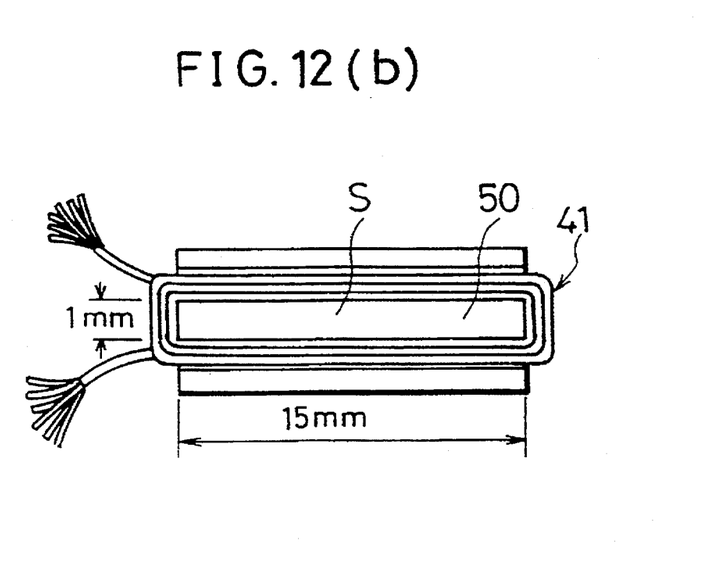
FIG. 12(b) is a bottom view showing the structure of the magnetic head.

As illustrated in FIG. 12(b), the magnetic head 40 includes a magnetic core 50 having a cross section S which is calculated by multiplying a dimension of the magnetic core 50 in the radial direction of the magneto-optical disk (15 mm) by a dimension thereof in a direction perpendicular to the radial direction (1 mm). As illustrated in FIGS. 11 and 12(a), a coil 41 to be wound on the magnetic core 50 is formed by coils of a set of six conducting wires 42 having a wire diameter of 70 μm with eight turns. The inductance of each coil of the conducting wire 42 in the coil 41 is 30 μH (1 MHz).

Figure 13:
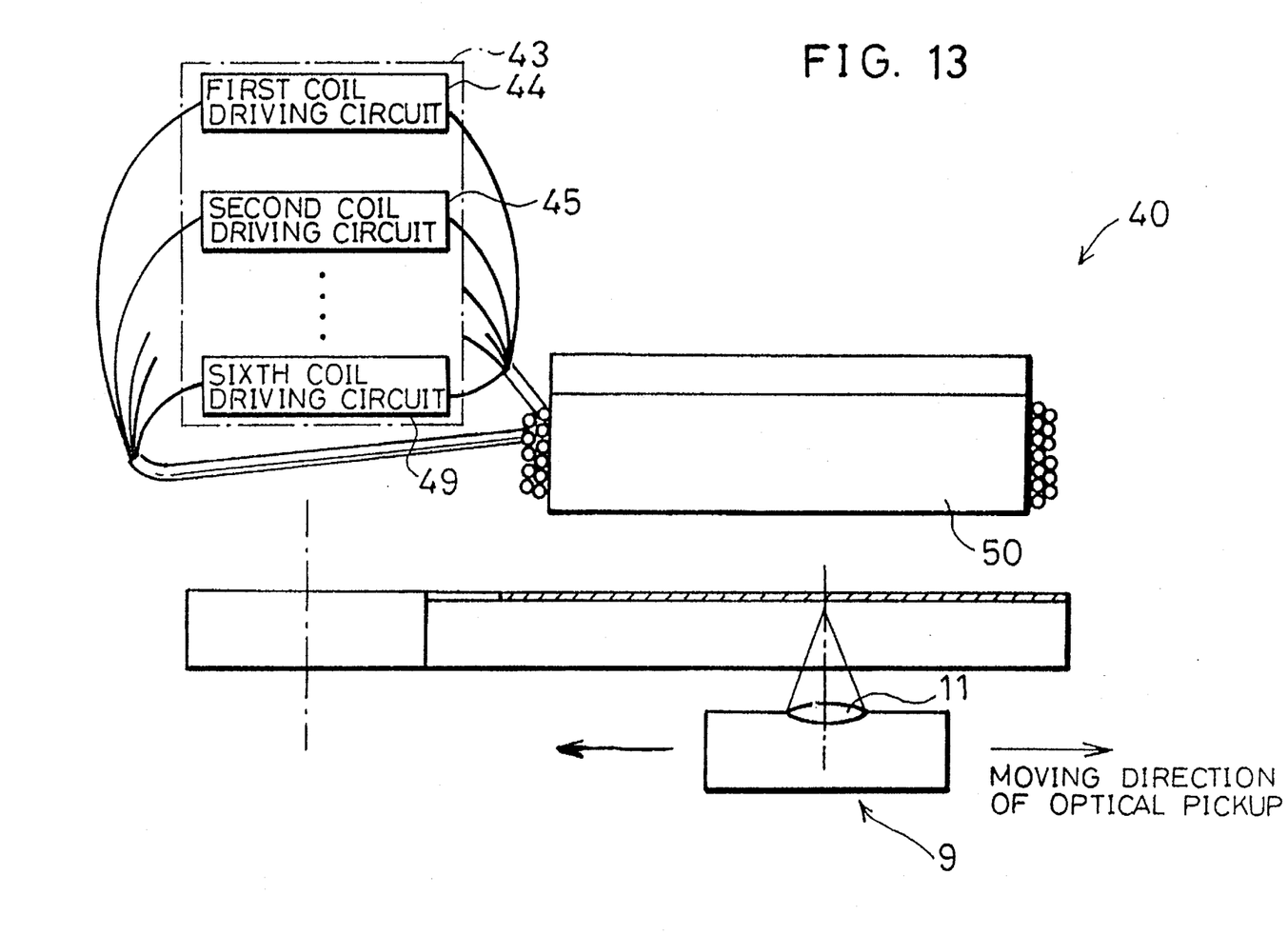
FIG. 13 is a depiction showing the structure of the magneto-optical recording and reproducing apparatus, and a relationship between the length of the magnetic head and the recording area of a magneto-optical disk.

As illustrated in FIG. 13, a magnetic-field generator 43 for driving the coil 41 includes first to six coil driving circuits 44 to 49 for the six conducting wires 42. If a current of 0.3 A flows in the six conducting wires 42 simultaneously, the strength of a perpendicular magnetic field becomes 800 A/m at a position 0.2 mm apart from the magnetic head 40. When the coil driving circuit 20 shown in FIG. 3 is used, if the inductance is 30 μH, a switching speed of magnetic field of around 160 ns is obtained by the equation mentioned in Embodiment 1. With this switching speed of magnetic field, recording by EFM (eight to fourteen) modulation is available. The EFM modulation is a method of modulation used for compact disks and mini disks, and the frequency used for recording a minimum bit is 720 kHz.

As described above, in the magneto-optical recording and reproducing device of this embodiment, since a length of the magnetic field generated by the magnetic head 40 in a radial direction of the magneto-optical disk is made larger than a total width of the plurality of tracks in the information recording area, it is possible to ensure a conventional large magnetic field generating area. Since a coil is separated into six coils in this condition, a higher switching speed of magnetic field is obtained.

Moreover, the use of the magnetic head 40 enables high-speed access to a magneto-optical disk. More specifically, in a conventional apparatus, since an optical pickup and a magnetic head are mechanically connected, the optical pickup and the magnetic head are moved together when accessing to the magneto-optical disk. On the other hand, since the magnetic head 40 of this embodiment is fixed to the apparatus, high-speed access becomes available. This structure also prevents an increase in the weight of the moving part due to the connection between the optical pickup and the magnetic head in the conventional device. Furthermore, when adjusting the positions of the objective lens 11 and the magnetic core 50, it is not necessary to adjust the position of the magnetic core 50 in a radial direction of the magneto-optical disk orthogonal to a track direction thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magneto-optical recording and reproducing apparatus, for recording information on a storage medium by modulating a magnetic field in response to a recording signal, magnetic head means having a plurality of coils;

at least one coil driving means for driving at least one of said coils, and for reversing a direction of the magnetic field generated by said driven coil in response to the input recording signal; and selection means for selecting said coil driving means in accordance with a selection request so as to transmit the recording signal only to the selected coil driving means, and for causing the coils corresponding to the selected coil driving means to generate a magnetic field strength which varies depending on the number of the selected coil driving means.

2. The magneto-optical recording and reproducing apparatus according to claim 1, wherein there are a plurality of said coil driving means which are connected in parallel.

3. The magneto-optical recording and reproducing apparatus according to claim 2, further comprising a single power source for supplying power to said coil driving means for driving said coils, wherein said coil driving means are connected to said power source in parallel.

4. The magneto-optical recording and reproducing apparatus according to claim 2, wherein each of said coil driving means includes an LC circuit having one of said coils and a capacitor connected to said coil in parallel, and switching speeds of magnetic field in said coils are set uniform by adjusting a capacitance of said capacitor.

5. The magneto-optical recording and reproducing apparatus according to claim 1, further comprising a control signal generating circuit, connected to said selecting means, for generating recording magnetic field control signals, wherein a combination of high level and low level of the recording magnetic field control signals changes according to the recording signal, and the recording magnetic field control signals control the switching operation of said selecting means.

6. The magneto-optical recording and reproducing apparatus according to claim 1, wherein said selecting means includes:

gate circuits for switching transmission of the recording signal to said coil driving means between on and off; and gate switching signal generating circuits for generating a gate switching signal for switching said gate circuits between on and off, and wherein the number of gate circuits and the number of said gate switching signal generating circuits are equal to the number of coil driving means.

7. The magneto-optical recording and reproducing apparatus according to claim 5, further comprising a circuit, connected to said control signal generating circuit, for converting a binary recording signal into a multilevel recording signal according to a strength of a magnetic field for recording, wherein said multilevel recording signal is converted into the recording magnetic field control signal by said circuit, and wherein a direction and a strength of the magnetic field in said magnetic head means are controlled in a number of ways not smaller than the number of said coils.

8. The magneto-optical recording and reproducing apparatus according to claim 7, wherein said magneto-optical recording and reproducing apparatus uses a storage medium having a multilayer structure including recording films arranged one upon another, and performs multilevel recording by a combination of magnetization directions of said films.

9. The magneto-optical recording and reproducing apparatus according to claim 1, wherein said magnetic head means includes a magnetic core, and said coils are wound in series around said magnetic core.

10. The magneto-optical recording and reproducing apparatus according to claim 1, wherein said magnetic head means includes a magnetic core, and said coils have different diameters and are wound one upon another around said magnetic core.

11. The magneto-optical recording and reproducing apparatus according to claim 1, wherein a length of a magnetic field generated by said magnetic head means in a radial direction of said storage medium is not smaller than a length of a recording area of said storage medium.

12. The magneto-optical recording apparatus according to claim 1, wherein there is at least one coil driving means associated with each coil, and said selection means selects at least one of said coil driving means.

13. A magneto-optical recording and re-producing apparatus, for recording information on a storage medium by modulating a magnetic field in response to a recording signal, comprising:

magnetic head means having a plurality of coils;

coil driving means equal in number to the number of coils, for reversing a direction of a magnetic field generated by a coil that is driven, in response to the recording signal; and selection means for selecting at least one coil driving means in response to a selection request, so as to transmit the recording signal only to the selected coil driving means to generate a magnetic field having a strength which varies depending on the number of the coil driving means selected by the selection means.

* * * * *